(12) United States Patent
Paknad et al.

(10) Patent No.: US 8,327,384 B2
(45) Date of Patent: Dec. 4, 2012

(54) EVENT DRIVEN DISPOSITION

(75) Inventors: Deidre Paknad, Palo Alto, CA (US); Pierre Raynaud-Richard, Redwood City, CA (US); Andrey Pogodin, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 1039 days.

(21) Appl. No.: 12/164,468

(22) Filed: Jun. 30, 2008

(65) Prior Publication Data

US 2009/0328070 A1    Dec. 31, 2009

(51) Int. Cl.
*G06F 9/54* (2006.01)
*G06F 7/00* (2006.01)

(52) U.S. Cl. .................. 719/318; 707/661; 707/662

(58) Field of Classification Search .............. None
See application file for complete search history.

(56) References Cited

U.S. PATENT DOCUMENTS

| | | |
|---|---|---|
| 5,355,497 A | 10/1994 | Cohen-Levy |
| 5,608,865 A | 3/1997 | Midgely et al. |
| 5,701,472 A | 12/1997 | Koerber et al. |
| 5,875,431 A | 2/1999 | Heckman et al. |
| 5,903,879 A | 5/1999 | Mitchell |
| 5,963,964 A | 10/1999 | Nielsen |
| 6,049,812 A | 4/2000 | Bertram et al. |
| 6,115,642 A | 9/2000 | Brown et al. |
| 6,128,620 A | 10/2000 | Pissanos et al. |
| 6,151,031 A | 11/2000 | Atkins et al. |
| 6,173,270 B1 | 1/2001 | Cristofich et al. |
| 6,330,572 B1 | 12/2001 | Sitka |
| 6,332,125 B1 | 12/2001 | Callen et al. |
| 6,343,287 B1 | 1/2002 | Kumar et al. |
| 6,401,079 B1 | 6/2002 | Kahn et al. |
| 6,425,764 B1 | 7/2002 | Lamson |
| 6,460,060 B1 | 10/2002 | Maddalozzo, Jr. et al. |
| 6,539,379 B1 | 3/2003 | Vora et al. |
| 6,553,365 B1 | 4/2003 | Summerlin et al. |
| 6,607,389 B2 | 8/2003 | Genevie |
| 6,622,128 B1 | 9/2003 | Bedell et al. |
| 6,738,760 B1 | 5/2004 | Krachman |
| 6,805,351 B2 | 10/2004 | Nelson |
| 6,832,205 B1 | 12/2004 | Aragones et al. |
| 6,839,682 B1 | 1/2005 | Blume et al. |
| 6,944,597 B2 | 9/2005 | Callen et al. |
| 6,966,053 B2 | 11/2005 | Paris et al. |
| 6,976,083 B1 | 12/2005 | Baskey et al. |
| 6,981,210 B2 | 12/2005 | Peters et al. |
| 7,076,439 B1 | 7/2006 | Jaggi |

(Continued)

FOREIGN PATENT DOCUMENTS

EP    2110781 A1    10/2009

OTHER PUBLICATIONS

"Microsoft Computer Dictionary", 2002, Microsoft Press, Fifth Edition, p. 499.*

Human Capital Mangement; "mySAP . . . management"; retrieved from archive.org Aug. 18, 2009 www.sap.com.

(Continued)

*Primary Examiner* — Qing Wu
(74) *Attorney, Agent, or Firm* — Shumaker & Sieffert, P.A.

(57) ABSTRACT

This disclosure relates to systems, methods and apparatuses for managing the retention and disposition of data for an event consumer using an Enterprise Retention Management System wherein the management is driven by business events.

40 Claims, 9 Drawing Sheets

U.S. PATENT DOCUMENTS

| | | |
|---|---|---|
| 7,082,573 B2 | 7/2006 | Apparao et al. |
| 7,103,602 B2 | 9/2006 | Black et al. |
| 7,104,416 B2 | 9/2006 | Gasco et al. |
| 7,107,416 B2 | 9/2006 | Stuart et al. |
| 7,127,470 B2 | 10/2006 | Takeya |
| 7,146,388 B2 | 12/2006 | Stakutis et al. |
| 7,162,427 B1 | 1/2007 | Myrick et al. |
| 7,197,716 B2 | 3/2007 | Newell et al. |
| 7,225,249 B1 | 5/2007 | Barry et al. |
| 7,233,959 B2 | 6/2007 | Kanellos et al. |
| 7,236,953 B1 | 6/2007 | Cooper et al. |
| 7,240,296 B1 | 7/2007 | Matthews et al. |
| 7,249,315 B2 | 7/2007 | Moetteli |
| 7,281,084 B1 | 10/2007 | Todd et al. |
| 7,283,985 B2 | 10/2007 | Schauerte et al. |
| 7,284,985 B2 | 10/2007 | Genevie |
| 7,333,989 B1 | 2/2008 | Sameshima et al. |
| 7,386,468 B2 | 6/2008 | Calderaro et al. |
| 7,433,832 B1 | 10/2008 | Bezos et al. |
| 7,451,155 B2 | 11/2008 | Slackman et al. |
| 7,478,096 B2 | 1/2009 | Margolus et al. |
| 7,496,534 B2 | 2/2009 | Olsen et al. |
| 7,502,891 B2 | 3/2009 | Shachor |
| 7,512,636 B2 | 3/2009 | Verma et al. |
| 7,558,853 B2 | 7/2009 | Alcorn et al. |
| 7,580,961 B2 | 8/2009 | Todd et al. |
| 7,594,082 B1 | 9/2009 | Kilday et al. |
| 7,596,541 B2 | 9/2009 | deVries et al. |
| 7,614,004 B2 | 11/2009 | Milic-Frayling et al. |
| 7,617,458 B1 | 11/2009 | Wassom, Jr. et al. |
| 7,636,886 B2 | 12/2009 | Wyle et al. |
| 7,720,825 B2 | 5/2010 | Pelletier et al. |
| 7,730,148 B1 | 6/2010 | Mace et al. |
| 7,742,940 B1 | 6/2010 | Shan et al. |
| 7,774,721 B2 | 8/2010 | Milic-Frayling et al. |
| 7,778,976 B2 * | 8/2010 | D'Souza et al. .............. 707/665 |
| 7,861,166 B1 | 12/2010 | Hendricks |
| 7,865,817 B2 | 1/2011 | Ryan et al. |
| 7,895,229 B1 | 2/2011 | Paknad |
| 7,962,843 B2 | 6/2011 | Milic-Frayling et al. |
| 8,073,729 B2 | 12/2011 | Kisin et al. |
| 2001/0053967 A1 | 12/2001 | Gordon et al. |
| 2002/0007333 A1 | 1/2002 | Scolnik et al. |
| 2002/0010708 A1 | 1/2002 | McIntosh |
| 2002/0022982 A1 | 2/2002 | Cooperstone et al. |
| 2002/0035480 A1 | 3/2002 | Gordon et al. |
| 2002/0083090 A1 | 6/2002 | Jeffrey et al. |
| 2002/0091553 A1 | 7/2002 | Callen et al. |
| 2002/0091836 A1 | 7/2002 | Moetteli |
| 2002/0095416 A1 | 7/2002 | Schwols |
| 2002/0103680 A1 | 8/2002 | Newman |
| 2002/0108104 A1 | 8/2002 | Song et al. |
| 2002/0119433 A1 | 8/2002 | Callender |
| 2002/0120859 A1 | 8/2002 | Lipkin et al. |
| 2002/0123902 A1 | 9/2002 | Lenore et al. |
| 2002/0143595 A1 | 10/2002 | Frank et al. |
| 2002/0143735 A1 | 10/2002 | Ayi et al. |
| 2002/0147801 A1 | 10/2002 | Gullotta et al. |
| 2002/0162053 A1 | 10/2002 | Os |
| 2002/0178138 A1 | 11/2002 | Ender et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado |
| 2003/0018663 A1 | 1/2003 | Cornette et al. |
| 2003/0018693 A1 | 1/2003 | Rosenfeld et al. |
| 2003/0031991 A1 | 2/2003 | Genevie |
| 2003/0033295 A1 | 2/2003 | Adler et al. |
| 2003/0036994 A1 | 2/2003 | Witzig et al. |
| 2003/0046287 A1 | 3/2003 | Joe |
| 2003/0051144 A1 | 3/2003 | Williams |
| 2003/0069839 A1 | 4/2003 | Whittington et al. |
| 2003/0074354 A1 | 4/2003 | Lee et al. |
| 2003/0097342 A1 | 5/2003 | Whittington |
| 2003/0110228 A1 | 6/2003 | Xu et al. |
| 2003/0139827 A1 | 7/2003 | Phelps |
| 2003/0229522 A1 | 12/2003 | Thompson et al. |
| 2004/0002044 A1 | 1/2004 | Genevie |
| 2004/0003351 A1 | 1/2004 | Sommerer et al. |
| 2004/0019496 A1 | 1/2004 | Angle et al. |
| 2004/0034659 A1 | 2/2004 | Steger |
| 2004/0039933 A1 | 2/2004 | Martin et al. |
| 2004/0060063 A1 | 3/2004 | Russ et al. |
| 2004/0068432 A1 | 4/2004 | Meyerkopf et al. |
| 2004/0078368 A1 | 4/2004 | Excoffier et al. |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0103284 A1 | 5/2004 | Barker |
| 2004/0133573 A1 | 7/2004 | Miloushev et al. |
| 2004/0138903 A1 | 7/2004 | Zuniga |
| 2004/0143444 A1 | 7/2004 | Opsitnick et al. |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0215619 A1 | 10/2004 | Rabold |
| 2004/0216039 A1 | 10/2004 | Lane et al. |
| 2004/0260569 A1 | 12/2004 | Bell et al. |
| 2005/0060175 A1 | 3/2005 | Farber et al. |
| 2005/0071251 A1 | 3/2005 | Linden et al. |
| 2005/0071284 A1 | 3/2005 | Courson et al. |
| 2005/0074734 A1 | 4/2005 | Randhawa |
| 2005/0114241 A1 | 5/2005 | Hirsch et al. |
| 2005/0144114 A1 | 6/2005 | Ruggieri et al. |
| 2005/0160361 A1 | 7/2005 | Young |
| 2005/0165734 A1 | 7/2005 | Vicars et al. |
| 2005/0187813 A1 | 8/2005 | Genevie |
| 2005/0203821 A1 | 9/2005 | Petersen et al. |
| 2005/0240578 A1 | 10/2005 | Biederman, Sr. et al. |
| 2005/0246451 A1 | 11/2005 | Silverman et al. |
| 2005/0283346 A1 | 12/2005 | Elkins, II et al. |
| 2006/0036464 A1 | 2/2006 | Cahoy et al. |
| 2006/0036649 A1 | 2/2006 | Simske et al. |
| 2006/0074793 A1 | 4/2006 | Hibbert et al. |
| 2006/0095421 A1 | 5/2006 | Nagai et al. |
| 2006/0126657 A1 | 6/2006 | Beisiegel et al. |
| 2006/0136435 A1 | 6/2006 | Nguyen et al. |
| 2006/0143248 A1 | 6/2006 | Nakano et al. |
| 2006/0143464 A1 | 6/2006 | Ananthanarayanan et al. |
| 2006/0149407 A1 | 7/2006 | Markham et al. |
| 2006/0149735 A1 | 7/2006 | DeBie et al. |
| 2006/0156381 A1 | 7/2006 | Motoyama |
| 2006/0156382 A1 | 7/2006 | Motoyama |
| 2006/0167704 A1 | 7/2006 | Nicholls et al. |
| 2006/0174320 A1 | 8/2006 | Maru et al. |
| 2006/0178917 A1 | 8/2006 | Merriam et al. |
| 2006/0184718 A1 | 8/2006 | Sinclair |
| 2006/0195430 A1 | 8/2006 | Arumainayagam et al. |
| 2006/0229999 A1 | 10/2006 | Dodell et al. |
| 2006/0230044 A1 | 10/2006 | Utiger |
| 2006/0235899 A1 | 10/2006 | Tucker |
| 2006/0242001 A1 | 10/2006 | Heathfield |
| 2007/0016546 A1 | 1/2007 | De Vorchik et al. |
| 2007/0048720 A1 | 3/2007 | Billauer |
| 2007/0061156 A1 | 3/2007 | Fry et al. |
| 2007/0061157 A1 | 3/2007 | Fry et al. |
| 2007/0078900 A1 | 4/2007 | Donahue |
| 2007/0099162 A1 | 5/2007 | Sekhar |
| 2007/0100857 A1 | 5/2007 | DeGrande et al. |
| 2007/0112783 A1 | 5/2007 | McCreight et al. |
| 2007/0118556 A1 | 5/2007 | Arnold et al. |
| 2007/0156418 A1 | 7/2007 | Richter et al. |
| 2007/0162417 A1 | 7/2007 | Cozianu et al. |
| 2007/0179829 A1 | 8/2007 | Laperi et al. |
| 2007/0203810 A1 | 8/2007 | Grichnik |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0271308 A1 * | 11/2007 | Bentley et al. ................ 707/200 |
| 2007/0271517 A1 | 11/2007 | Finkelman et al. |
| 2007/0282652 A1 | 12/2007 | Childress et al. |
| 2007/0288659 A1 | 12/2007 | Zakarian et al. |
| 2008/0033904 A1 | 2/2008 | Ghielmetti et al. |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |

| | | |
|---|---|---|
| 2008/0071561 A1 | 3/2008 | Holcombe |
| 2008/0126156 A1 | 5/2008 | Jain et al. |
| 2008/0147642 A1 | 6/2008 | Leffingwell et al. |
| 2008/0148193 A1 | 6/2008 | Moetteli |
| 2008/0148346 A1 | 6/2008 | Gill et al. |
| 2008/0154969 A1 | 6/2008 | DeBie |
| 2008/0154970 A1 | 6/2008 | DeBie |
| 2008/0177790 A1 | 7/2008 | Honwad |
| 2008/0195597 A1 | 8/2008 | Rosenfeld et al. |
| 2008/0209338 A1 | 8/2008 | Li |
| 2008/0229037 A1 | 9/2008 | Bunte et al. |
| 2008/0294674 A1 | 11/2008 | Reztlaff et al. |
| 2008/0301207 A1 | 12/2008 | Demarest et al. |
| 2008/0312980 A1 | 12/2008 | Boulineau et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1 | 2/2009 | Yao |
| 2009/0064184 A1 | 3/2009 | Chacko et al. |
| 2009/0094228 A1 | 4/2009 | Bondurant et al. |
| 2009/0100021 A1 | 4/2009 | Morris et al. |
| 2009/0106815 A1 | 4/2009 | Brodie et al. |
| 2009/0119677 A1 | 5/2009 | Stefansson et al. |
| 2009/0150168 A1 | 6/2009 | Schmidt |
| 2009/0150866 A1 | 6/2009 | Schmidt |
| 2009/0150906 A1 | 6/2009 | Schmidt et al. |
| 2009/0193210 A1 | 7/2009 | Hewett et al. |
| 2009/0241054 A1 | 9/2009 | Hendricks |
| 2009/0249179 A1 | 10/2009 | Shieh et al. |
| 2009/0249446 A1 | 10/2009 | Jenkins et al. |
| 2009/0254572 A1 | 10/2009 | Redlich et al. |
| 2009/0287658 A1 | 11/2009 | Bennett |
| 2010/0017756 A1 | 1/2010 | Wassom, Jr. et al. |
| 2010/0050064 A1 | 2/2010 | Liu et al. |
| 2010/0070315 A1 | 3/2010 | Lu et al. |
| 2010/0088583 A1 | 4/2010 | Schachter |
| 2010/0251109 A1 | 9/2010 | Jin et al. |
| 2011/0191344 A1 | 8/2011 | Jin et al. |

OTHER PUBLICATIONS

Zhu, et al.; "Query Expansion Using Web Access Log Files"; Lecture Notes in Computer Science, 2005, vol. 3588/2005, pp. 686-695, Springer-Verlag Berlin Hedelberg.

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Preservation Benchmarks for 2007 and Beyond, www.pss-systems.com, pp. 1-3 (2007).

PSS Sytems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

www.pss-systems.com; retrieved from www. Archive.org any linkage dated Dec. 8, 2005, 131 pages.

PSS Systems, Inc., Litigation Communications and Collections, www.pss-systems.com (2006), retrieved online on Dec. 8, 2010 from archive.org, 1 page.

Cohasset Associates, "White Paper: Compliance Requirements Assessment, IBM DB2 Records Manager and Record-Enabled Solutions", Oct. 2004, 54 pgs.

"HEI Records Management: Guidance on Developing a File Plan", JISC infoNet, Jan. 2007, 7 pgs.

Lewis "Digital Mountin—Where Data Resides—Data Discovery from the Inside Out", available at http://digitalmountain.com/fullaccess/Article3.pdf accessed Mar. 13, 2012, Digital Mountain, Inc., 2004, 5 pgs.

Sears "E-Discovery: A Tech Tsunami Rolls In", available at http://www.krollontrack.com/publications/ediscoverybackgroundpaper.pdf, accessed Mar. 13, 2012, National Court Reporters Association, Apr. 2006, 7 pgs.

* cited by examiner

"Common disposition request"
    -Retention schedule ID (RC101, RC102 or RC103)
    -User ID
    -First name
    -Last name
    -mailbox
    -SSN "Disposition request RC101"
-User ID
-First name
-Last name
"Disposition request RC102"
    - mailbox
"Disposition request RC103"
    - SSN

EVENT DRIVEN DISPOSITION

FIELD OF THE INVENTION

The present invention relates to systems for the disposition of data. More specifically, the present invention relates to technology for retention policy management, record management and enterprise integration for data disposition.

BACKGROUND

Business organizations retain electronic documents, records and other data in storage for extended periods of time for a number of reasons including easy access, internal policy, and regulation compliance, among other various reasons. For instance, government regulation may require an organization to retain certain securities information for a given duration for SEC compliance. Likewise, some organizations retain electronic records of documents for audit and/or litigation purposes.

Oftentimes data storage systems involve storing data with an associated retention policy. The retention policy indicates a time period for the retention of the data and when the time period lapse, the data is typically disposed of automatically. According to known methods, a system administrator must dispose of data manually based on retention policies stored on paper or in other non structured form. Organizations managing a large amount of stored data will incur time-consuming and costly expenses in performing data disposition manually.

Furthermore, an error in data disposition may result in dire consequences. For instance, in cases where data wasn't disposed of, too much data has been disposed of, or wrong data has been disposed of, an organization may incur unwanted legal and business consequences. Therefore, there is a need in eliminating human factor from data disposition as much as possible.

There is no uniform view on how to manage disposition of data. This needs to be changed in order to get under control growing storage and legal costs associated with storing unnecessary information. Vendors should start designing their applications with data disposition in mind. To achieve that, they need to agree on common ways to manage data disposition.

Different types of data is associated with different retention schedules (i.e. rules describing how long the information should be preserved in a certain data source, what is the type of event that triggers measuring of the disposition period, and what should be done with the information when the disposition period is due). Some data sources can enforce retention schedules e.g. dispose of data using the rules defined by retention schedules, some cannot. For the latter type, it is hard to build an automated disposition solution using enterprise integration technologies such as integration middleware. This is mainly because retention schedule information is missing in most data sources and because the retention schedule information is a critical part of a solution that defines delays between the time a triggering event occurred and the time when a document should be disposed of.

Enterprise level data retention management is an emerging technology. Currently, Enterprise Retention Management systems (ERM systems) store references to data sources and store retention policies in a structured format. However, the retention policies were not utilized in a structured format to affect the disposition of data.

SUMMARY OF THE DISCLOSURE

Business events have a substantial effect on how long certain data must legally be retained. Known methods of data retention management for an enterprise system are not designed to use machine readable retention schedules when dealing with the disposition of data. To fill the need for such a system, the present invention discloses an Enterprise Retention Management System which considers business events coming from a data source that may result in disposition of documents in another data source.

This disclosure relates to systems, methods and apparatuses for managing the retention and disposition of data by an Enterprise Retention Management System. The retention and disposition of data is driven by business events. These business events originate in an event producer. An Enterprise Retention Management System is provided to manage retention and disposition actions. Business events are propagated between the event producer and the Enterprise Retention Management System, and the Enterprise Retention Management System translates the business events into Disposition Requests. Event consumers are identified wherein the event consumers include systems and applications having data with retention attributes. The Disposition Requests are propagated between the Enterprise Retention Management System and the event consumers, wherein the disposition requests result in the disposition of data.

The business events are propagated between the event producer and the Enterprise Retention Management System in a variety of ways. In some embodiments of the present invention, the business events are pushed from the event producer and the Enterprise Retention Management System. In some other embodiments of the present invention, the business events are pulled from the event producer to the Enterprise Retention Management System to event producer. In yet other embodiments, a business event is manually entered into the Enterprise Retention Management System via a user interface.

In some embodiments of the present invention, a direct link is established between an event producer and an Enterprise Retention Management System. In other embodiments, one or more connectors are utilized to couple the event producer and the Enterprise Retention Management System. In some embodiments of the present invention, the connector is a node comprising software either integrated within the ERM machine or located on another machine within a network coupled with the ERM machine. In yet other embodiments of the present invention, the connector is a proxy.

In some embodiments of the present invention, the Enterprise Retention Management System includes a routing configuration module allowing the user to configure the ERM based on specific Event Producers and Event Consumers. In some embodiments, a Graphical User Interface is provided to facilitate easy manual configuration. In some embodiments of the present invention, an event category hierarchy is provided to present event categorization to the user. In other embodiments of the present invention, the step of configuration is automatically performed.

In some embodiments of the present invention, the Enterprise Retention Management System polls the event consumer to determine information about the event consumer. In some embodiments, the polling identifies whether an event consumer is a simple-consumer or a retention-capable consumer. In some embodiments of the present invention, the Enterprise Retention Management System manages a retention schedule for a simple-consumer and sends a simple delete instruction to the event consumer. In some embodiments of the present invention, a retention-capable consumer manages a retention schedule for itself and the Enterprise Retention Management System simply sends the business event message to the consumer to trigger the disposition process.

DETAILED DESCRIPTION

Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Business events have a substantial effect on when it is appropriate to begin tolling a period before data may be disposed of. Known methods of data retention management to not provide an automatic method of capturing a business event, turn it into a disposition request and automatically propagate the disposition request to interested event consumers. To fill the need for such a system, the present invention discloses an Enterprise Retention Management System which takes into account various business events that may dispose of data related to the event in a data source.

Information Technology infrastructure will benefit from the methods of Event-Driven Disposition according to the present invention. The present invention is an Enterprise Retention Management System that allows for automated disposition of information in the Event Consumer data sources based on business events registered in Event Producer data sources, and catalog of Retention Schedules and map or data sources maintained by the Enterprise Retention Management System. The Enterprise Retention Management System orchestrates the propagation of business events from event producers to event consumers, translates business event parameters that came from an event producer into disposition request parameters understood by an event consumer, and enforces retention policies by delaying event propagation to the event consumers which are unable to manage retention policies themselves.

Such a solution will become a common way of orchestrating event-driven disposition, thus encouraging vendors to build event-driven disposition functionality into their products upfront.

Figure 1:
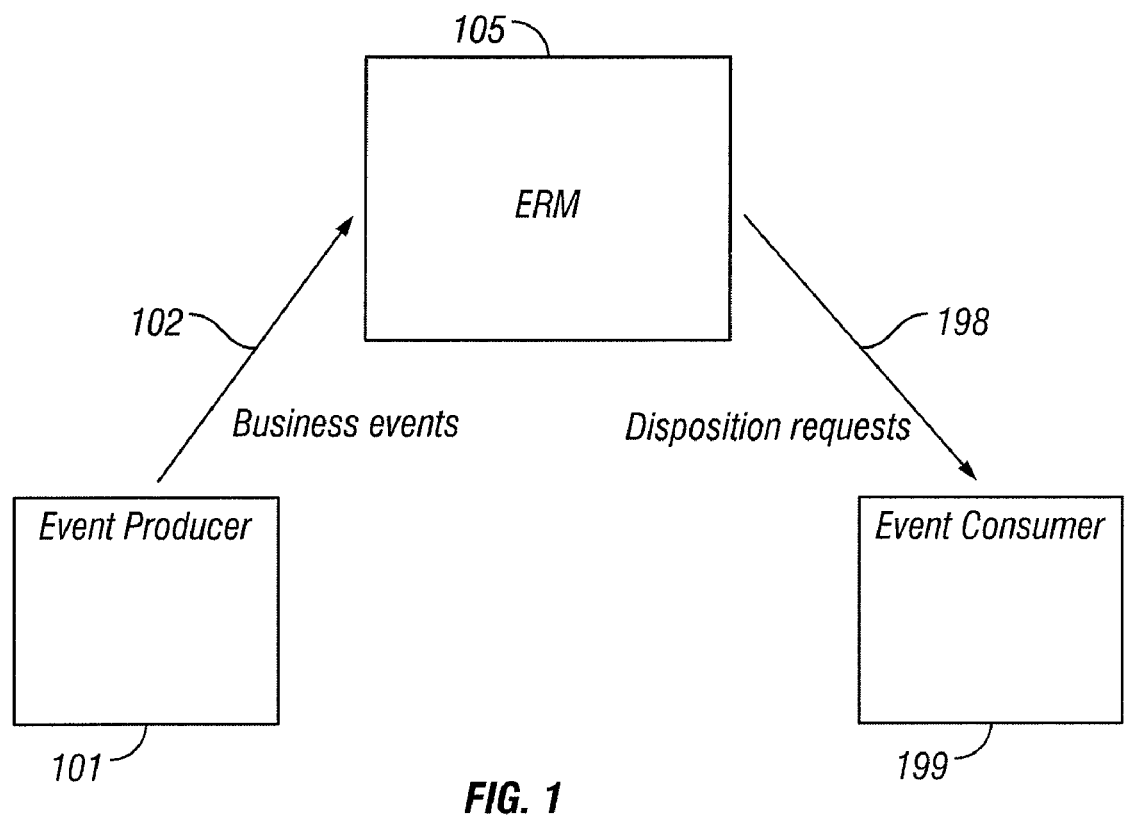
FIG. 1 illustrates a basic schematic diagram of the business event driven disposition method according to some embodiments of the present invention.

FIG. 1A illustrates a basic schematic diagram of the business event driven disposition method according to some embodiments of the present invention. An Event Producer data source 101 is provided. An Event Producer data source 101 is a source having an information system containing information about business events. Examples of business events include the termination of an employee, an employee transfer, a change in familial status of an employee, a management decision to discontinue a product or a management decision to discontinue a service. Although these specific examples of business events are disclosed explicitly, it will be readily apparent to those having ordinary skill in the art that any business event that can affect the retention of data is equally envisioned.

Business events are uploaded 102 to an Enterprise Retention Management System 105 (hereinafter referred to as an "ERM"). In some embodiments of the present invention, the event producer data source 101 pushes the business event to the ERM 105. In other embodiments, the business event is pulled from the event producer data source 101 into the ERM 105. In yet other embodiments, the business event is manually entered into the ERM 105.

Once a business event is received by the ERM 105, the ERM 105 identifies a portion of data within an Event Consumer data source 199. In some embodiments of the present invention, an explicit route between particular events from the event producer data source 101 and particular Event Consumer data sources 199 is established. In the present preferred embodiment of the present invention, a routing configuration module (not shown) is provided to establish routes (explained below). In some embodiments of the present invention the step of configuration is performed by a routing configuration application with a user interface that is part of the ERM. In other embodiments, a stand alone Configuration Application is coupled to the ERM and serves to configure routing information.

Once the business event is routed to an appropriate Event Consumer 199 and the parameters of the event are resolved (explained below), the ERM 105 then makes data disposition requests 198 to an Event Consumer data source 199. The Event Consumer data source 199 performs data disposition actions based on the information disposition requests 198.

The present invention operates according to these basic models. Below, the concepts are more specifically defined and the operation of the method is explained in more detail.

Event Producer Data Source

Event producers are information systems that contain information about some business events happening at the enterprise. Examples of business events are:

1. Employee John Smith was terminated
2. Employee Joseph Amino is transferred to a new department
3. Client Pat Rose got divorced
4. Production of BMW 330i 2008 has been discontinued
5. Technical support of Dell Optiplex 3000 has been discontinued In some embodiments of the present invention, event producers are structured information systems. According to the present invention events are recorded within the systems by changing a value of some status field in the database record. E.g. in case on employee termination, the field "employment_status" in "person" table of a Human Resource Management System gets changed to "terminated". Although the example of a Human Resource Management System is disclosed, it will be readily apparent to those having ordinary skill in the art and the benefit of this disclosure that many other types of Event Producers can utilize the event driven function of the present invention.

Event messages produced by an Event Producer oftentimes contain one or more parameters that describe the event. Typically, the parameters comprise a name and a value. For example, an event relating to an employee might contain the parameter "employee_id"="21422". According to the present invention, the structure of the parameters is flat (i.e. a list of name-value pairs) or hierarchal (where certain parameters contain child parameters).

Event consumers may require all or some parameter values to be passed to them in order to make a disposition. Sometimes, the information provided inside parameters is not sufficient for the Event Consumer to perform a disposition. For example, a Human Resource Management System serving as an Event Producer produces employee-related events with an "employee_id" parameter containing Human Resource Management System internal employee id which looks like "emplo000000000012351", whereas an access control system tags employee records using a Global Company Employee ID which looks like "pat.rose.xyzcorp.com".

In some embodiments of the present invention, there are some manual or automatic ways to resolve parameters provided by the Event Producer into parameters required by the Event Consumer. For example, a company may have a centralized unique identifier of the person, which can be resolved into unique identifiers of the same person specific to different information systems.

All the above events have a different nature, which we call "event type". Event types on the examples above are:
Employee termination
Internal employee transfer
Client divorce
Production discontinuance
Technical support discontinuance Event parameters can be further subdivided into the ones required for all event types by event-driven disposition infrastructure (infrastructural) and the ones that pertain to an event type. For example, the following parameters are envisioned for employee termination event type (there may be more):
Infrastructural:
DateTime occurred
DateTime communicated
Event ID
Event Type Specific:
Person ID
Person Username
Person Organization ID
Person Organization Name
Person First Name
Person Last Name
Person Mailbox
Service Rep ID
Comments
Extended Field 1
Extended Field 2
Extended Field 3
Extended Field 4
Extended Field 5

We are expecting that a business event will expose as many parameters as possible so we have enough information for all kinds of consumers. In this example, Person Mailbox information may be useful for propagating the event to email archives, and Extended Field 2 may contain person's global company ID used by access control system to store person's access records.

Event Consumer Data Sources

These are various types of information systems in a broad sense (file systems, content management systems, document management systems, structured applications, email servers and archives, instant messaging servers and archives, file archives, etc.) that can receive business events and perform data disposition based on these events.

Note that event consumers don't necessarily need to store digital information. For example, the event consumer may be an Iron Mountain Acutrack application that manages the storage and disposition of physical assets in Iron Mountain Corporation. Also, according to another example, Event consumers may be an issue tracking system such as BMC Remedy. Once the issuing tracking system receives a disposition request, it issues a service ticket to an IT employee, instructing the employee to perform a certain manual disposition task.

Tagged Information

Information on event consumer side should be somehow associated with parameter values of the event. For example the document management system that stores employment contracts may have a metadata key-value pair "employee_id=12388" associated with an MS Office Document file, indicating that this is the contract between the company and Pat Rose (from the example above).

There are many ways of how to tag the information. The way described above is good for document management systems e.g. EMC Documentum that contains semi-structured information. If the data source is structured e.g. Training and Certification Management System, the information is tagged by having a person identifier field in a database table. For example, certifications of Pat Rose can reside in "tpt_certification" table, and "person_id" field for all records related to Pat Rose will be set to "12388".

For our purposes it doesn't matter how the information is tagged as long as one can retrieve and destroy the data related to the event from this data source.

Retention Schedules and Document Types

In some embodiments of the present invention, a retention schedule is a rule telling how long the document (record, piece of information) should be retained in the data source (retention time), what the triggering event is after which the retention period starts to be counted, and what needs to be done when the retention period is due.

For example "the document must be DELETED 5 YEARS after EMPLOYEE TERMINATION" or "the document must be ARCHIVED 30 DAYS after DOCUMENT CREATION.

Note that triggering events may be related to the stored information itself (DOCUMENT CREATION) or to some external entity's lifecycle (EMPLOYEE TERMINATION).

Retention schedules can be further subdivided into document types. For example, retention schedule HR101 requiring documents to be stored for 5 years after employee termination may contain document type "401K" and "Incentive Stock Option Agreement". Document types may be hierarchical.

Records

In some embodiments of the present invention, Records are any pieces of information whose retention cycle we need to manage. This may be the Records as qualified by Records Management professionals, or any other piece of information, whose retention is worth being managed.

Enterprise Retention Management System (ERM)

According to the present invention, an ERM is an information system that:
1. Stores retention schedules;
2. Stores references to event producers;
3. Stores references to event consumers;
4. Stores relationships between event consumers and retention schedules that define what types of records are stored in the event consumer, and what are the retention schedules that need to be applied to these records;
5. Communicates with event producers and receives business events;
6. Communicates with event consumers and forwards disposition requests;
7. Has a capability to understand what events need to be routed from what event producers to what event consumers; and
8. Performs routing of events from event producers to event consumers (in a form of disposition requests) optionally taking responsibility for determining when events need to be forwarded based on retention information and event consumer capability (in case of Simple event consumers).

Stages of ERM Operation

Users interact with ERM on the following stages. The detailed description of certain operations performed on these stages will be provided below:

Setup. When Event Producers' and Event Consumers' hardware and software is being setup, communication channels are being established, Producer and Consumer data source information is being entered into ERM so ERM can call the services exposed by Event Producers and Event Consumers, retention schedule information is entered into ERM and retention schedules are associated with Event Consumer data source records in ERM.

Routing configuration. When user manually establishes the route from Event Producer into ERM through Paramerter Resolvers and Conditional Filers to Event Consumers Runtime. When ERM automatically manages event driven disposition by capturing the events on Event producer side and routing them to Event Consumers based on the route information setup on a previous stage.

Propagation of Disposition Information Between Event Producer and ERM

Figure 2:
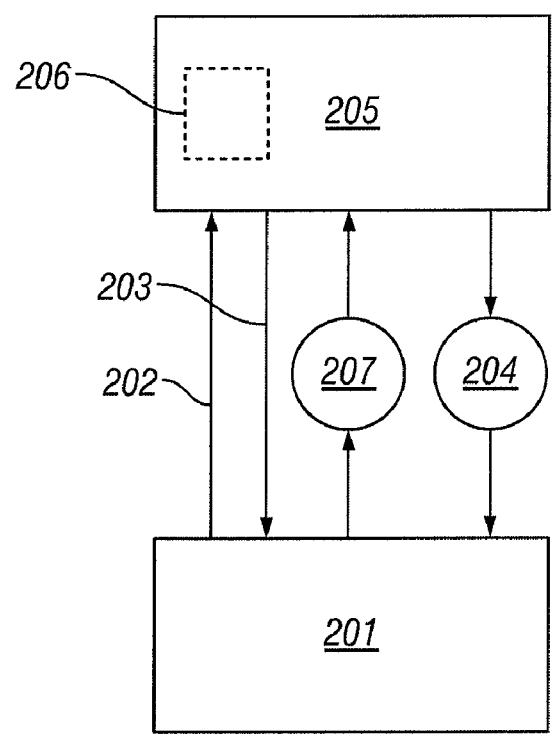
FIG. 2 illustrates a schematic diagram of the business event propagation between an event producer and the Enterprise Retention Management System according to some embodiments of the present invention.

There are a number of different ways to propagate disposition information between event producers, the ERM system and event consumers according to the present invention. FIG. 2 illustrates a schematic diagram of the business event propagation between an event producer 201 and the ERM 205 according to various embodiments of the present invention. The ERM 205 is able to receive business events in a variety of ways. In some embodiments of the present invention a business event is "Pushed" from the event producer 201 to the ERM 205 via data path 202. According to some embodiments of the presents, a business event "Pulled" by the ERM 205 from the event producer 201 via data path 203. Furthermore, according to some other embodiments, a user is able to make a manual entry of a business event through a graphical user interface 206 to the ERM 205.

In some embodiments of the present invention, the event producer 201 is not necessarily a data driven application. For example it can be some issue tracking system where a human operator creates business events. For example, employee termination according to the policy may require entering a service ticket into a BMC Remedy issue tracking system. Such a system can be integrated with ERM 205 and serve as event producer 201.

In some embodiments of the present invention, a push protocol 207 is used to facilitate "pushing" business events from the event producer 201 to the ERM 205. A multitude of push protocols 207 can be used for pushing the data into ERM 205. For example, the data can arrive though a SOAP Web Service request, through mail server (SMTP, POP, IMAP), through any of emerging peer-to-peer instant messaging style protocols, through native API call, etc.

Likewise, the data can be pulled from event producers 201 through a multitude of pull protocol 204. In some embodiments of the present invention, a standard pull protocol 204 is designed for exchanging business events between event producers 201 and the ERM 205. In some embodiments of the present invention, event producer specific software modules are developed that allow for communication between ERM 205 and disparate event producers 201.

In some embodiments of the present invention the pull protocol 204 is defined in Connector API that is implemented by the data source Connector. When API calls must result in actions against the data source, the Connector acts as a proxy that translates between standardized event-driven disposition API calls (messages) understood by ERM 205 and data source-specific API calls (messages) understood by the event producer 201.

According to these embodiments, the Connector API will expose the following services:

1. "Configuration" service exposed by the connector that tells ERM 205 about connector capabilities and required interactions. Namely, the configuration service response may contain:

List of event types exposed by the event producer with event parameter information Polling period—a recommended period of time between two subsequent event pull requests.

2. "Event" service that (in case of PULL model) is called by ERM 205 to retrieve events from the event producer. In case of PUSH model, this service will be exposed by ERM 205 and called by the connector.

Although highly desirable, Configuration service is not a necessary part of a solution. It can be replaced by setting up the connector information though ERM 205 user interface, or through a configuration file uploaded by the user.

Figure 3:
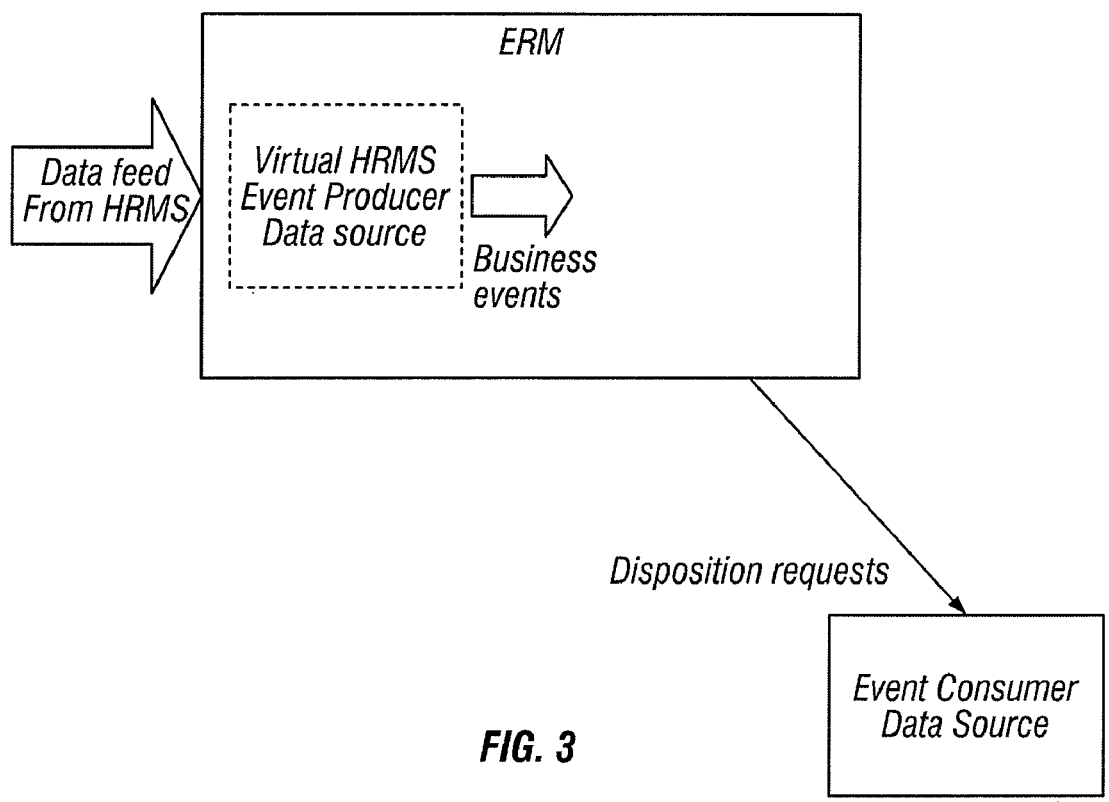
FIG. 3 illustrates a schematic diagram of an alternative method of business event propagation between an event producer and the Enterprise Retention Management System according to some embodiments of the present invention.

FIG. 3 illustrates another method of propagating business events to the ERM. Business events may also come from ERM integration APIs. ERM itself is usually integrated with HR Management systems, case management systems, etc. and can receive business events such as employee termination. If this is true, there is no need to integrate ERM one more time with say HR Management system through a separate connector. Instead, ERM should present an integration data feed as a "virtual" event producer data source to the Administrator when she needs to setup a route (see further for more detail on routes).

In yet other embodiments of the present invention, a combination of one or more of these techniques are able to taken advantage to propagate business events between the event producer 201 and the ERM 205.

Propagation of Disposition Information Between Event Consumer and ERM

Figure 4:
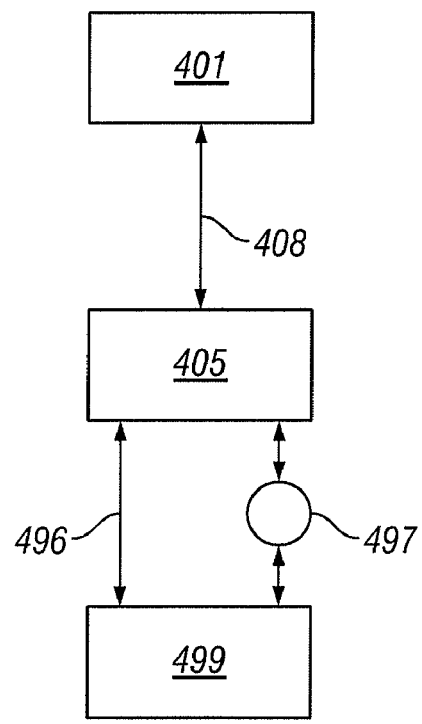
FIG. 4 illustrates a schematic diagram of the business event propagation between an event consumer and the Enterprise Retention Management System according to some embodiments of the present invention.

FIG. 4 illustrates a schematic diagram of the business event propagation between an event consumer 499 and the ERM 405 according to various embodiments of the present invention. Also shown in FIG. 4 is the event producer 401 and data path 408. The data path 408 is selected from among the various propagation methods described above. In some embodiments of the present invention, the ERM 405 propagates disposition information directly to the event consumer 499 via data path 496. In other embodiments, the ERM 405 communicates with event consumers 499 also through at least one event consumer connector 497.

According to some embodiments, the event consumer connector 497 is a proxy between ERM and Consumer. To perform disposition, the Connector translates between standardized ERM-side disposition requests initiated by ERM 405 and local API calls (messages) understood by the event consumer data source. According to these embodiments, each call contains a request and response. In request, the connector translates a standardized API call to data source specific API call. In response, the event consumer connector 497 translates from data source specific API response to standardized API response. This connector will provide:

"Configuration" service exposed by the connector that tell ERM:
what the event consumer type is (simple vs. retention-capable as described below) and
what are the types of disposition requests and their parameters.
"Disposition" service exposed by the connector through which ERM will send disposition requests to the connector.

In the present preferred embodiment, the connector 497 is a web service.

Although specific types of connectors 497 are disclosed it will be apparent to those having ordinary skill in the art that any connector is available for use so long as they accomplish the desired communication. Likewise, although the functionality between two Web Services is split between configuration and disposition, a skilled practitioner having benefit of the disclosure will understand that the same functionality may be wrapped in different number of services, and/or services can have different names, so long as they expose the same functionality. Configuration of Consumer parameters in ERM can be also achieved through ERM user interface or uploaded configuration files.

Retention-Capable and Simple Event Consumers

Event consumers have different capabilities when it comes to enforcing document disposition. For example there may be a website application that doesn't have a notion of data retention from which we want to delete a user account once the user closed his credit card, or there may be a record management system (RMS) capable of performing document disposition for a given client account according to the retention policy stored by RMS once it received the client account termination event. The former type of event consumers will be called "Simple"; the latter type will be called "Retention-capable".

Figure 5:
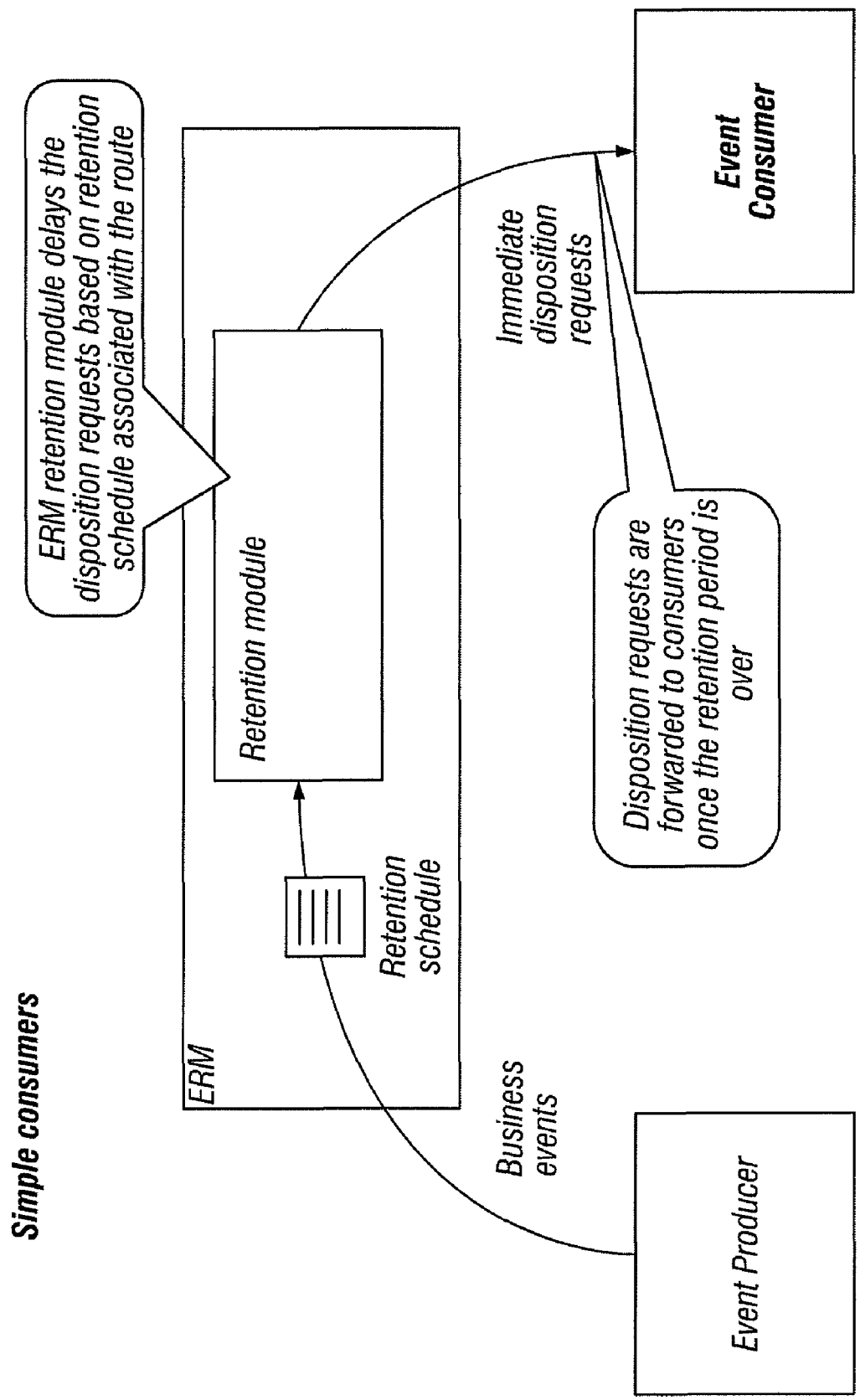
FIG. 5 illustrates a schematic diagram of a Simple Event Consumer type disposition system according to some embodiments of the present invention.

FIG. 5 illustrates a schematic diagram of a Simple Event Consumer type disposition system according to some embodiments of the present invention. In order to delete the data from simple event consumers, ERM needs to send a disposition command right in time when the data needs to be deleted. The time is calculated based on a retention policy stored in ERM. This means that ERM effectively becomes a policy management layer that receives the events and calculates the disposition period on top of such a data source.

Figure 6:
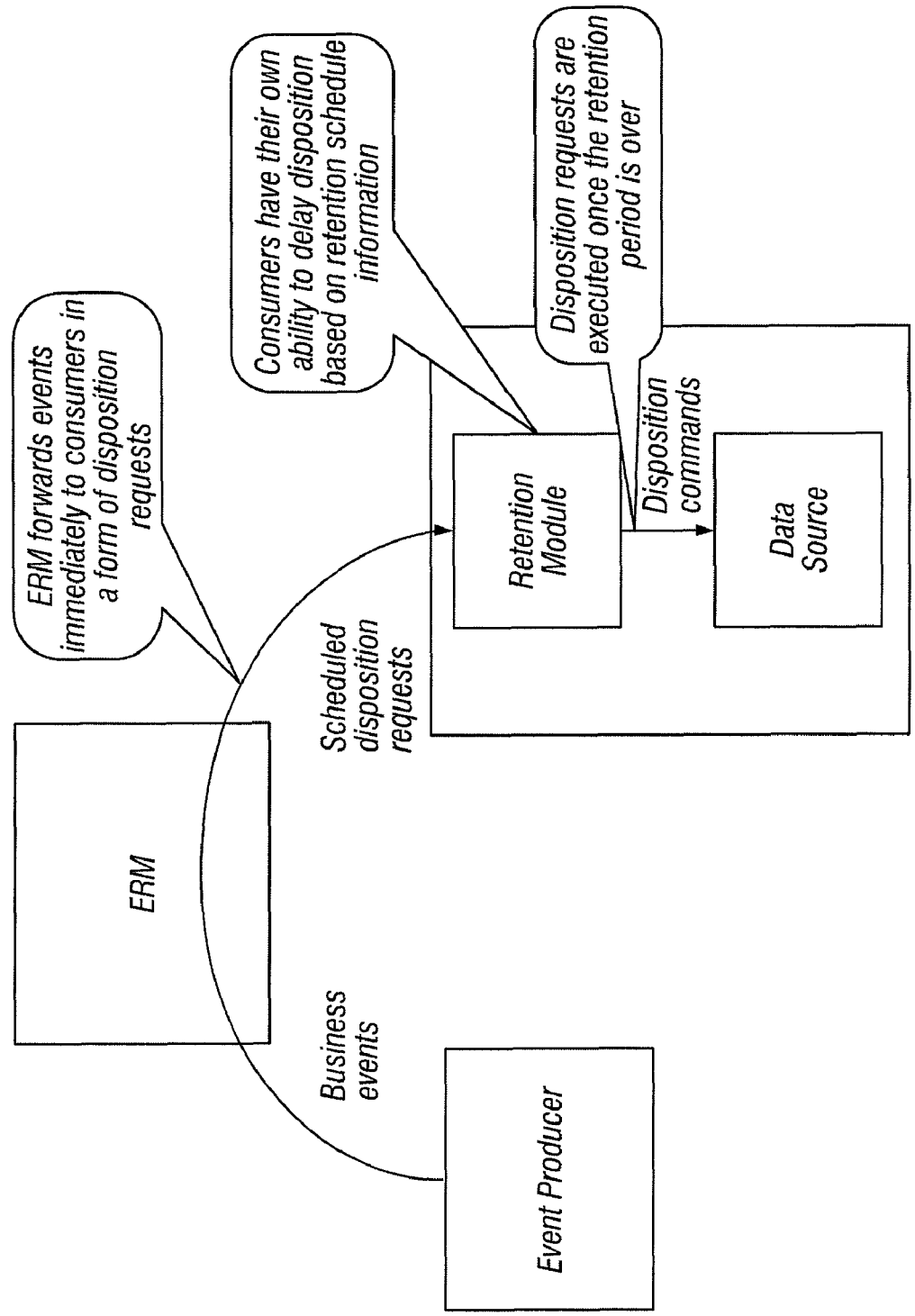
FIG. 6 illustrates a schematic diagram of a Retention Capable type disposition system according to some embodiments of the present invention.

FIG. 6 illustrates a schematic diagram of a Retention-capable type disposition system according to some embodiments of the present invention. According to these embodiments, retention-capable data sources do not need retention policies being enforced for them. They just need the business event to be propagated to them as fast as possible.

For the sake of clarity let's call the signals coming from ERM to event consumers "Disposition requests" so we don't confuse them with "events" that always come from event producer.

Let's further subdivide disposition requests into Immediate Disposition Requests (IDR) and Scheduled Disposition Requests (SDR). IDRs are used for communication with simple event consumers (SEC), and SDRs are used for communicating with retention-capable event consumers (REC).

Furthermore, in some embodiments of the present invention, simple event consumers can be converted into retention-capable event consumers by implementing retention policy management logic inside the connector.

Setting Up Event Routes

Event routing in the ERM is a major part of event-driven disposition according to some embodiments of the present invention. Event routing refers to the propagation of events from event producers to event consumers. Event routing setup should answer the questions:

From which event producer to which event consumer should the event be propagated
When should ERM issue a disposition request In some embodiments of the present invention, the event producer and the event consumer are specifically designed with the ERM in mind. According to these embodiments, event routing is easy since the parameters used by the event producer and the event consumer will be identical and the routes are obvious. However, in typical application, a route must be established for a business event originating in the event producer and propagated to the event consumer.

In the preferred embodiment of the present invention, event routing is accomplished explicitly. In explicit routing, the user manually identifies which business events need to be propagated from which event producers to which event consumers. In some embodiments of the present invention, such identification is achieved by a polling step. However, it will be readily apparent to those having ordinary skill in the art that other methods of routing exist. For example, in some embodiments the routes between event producers and event consumers are automatically set up using known information about the data sources.

In some embodiments of the present invention event producers are polled by ERM through a Configuration Service. In response, the Event Producers return the types of events that they produce. Likewise, event consumers are polled by ERM through a Configuration Service exposed by event consumer connector to return the types of disposition requests they can consume as well as the type of event consumer (simple, vs. retention-capable).

In some embodiments of the present invention, the ERM Administrator establishes a route from event producers to event consumers manually by performing the following steps:

1. Find an event producer that can produce the event type, Administrator is interested in;
2. Find an event consumer that needs to consume events or this type;
3. Choose one or multiple retention schedules or document types hosted by this event consumer that should be disposed of as a result of disposition request;
4. Associate information found in #1, #2 and #3 together thus creating an instruction for ERM to forward events coming from a producer to a consumer within the context of a given retention schedule(s) or a given document type(s).

Parameter Mapping

In general, names of the parameters coming from the event producer may differ from the names of the parameters required by event consumer when the disposition request is issued. Also, not all the parameters coming with the event are needed for a disposition request. For example parameters "first name" and "last name" inside "Employee terminated" event coming from HR management system are not needed to dispose of email in the email archive. Only "mailbox" parameter is required.

Therefore, there is a need in a configuration step when the Administrator maps parameters coming from the event producer to the parameters expected by event consumer inside a disposition request. As a result of such a mapping, ERM forwards a value associated with a certain key in event to a certain parameter inside the disposition request.

For example a value "user@address.com" mapped to "email" key in the employee disposition event coming from an HR management system will be forwarded to the parameter "mailbox" understood by Email archive connector inside the "Delete email" disposition request.

Configuration Process

Figure 7A:
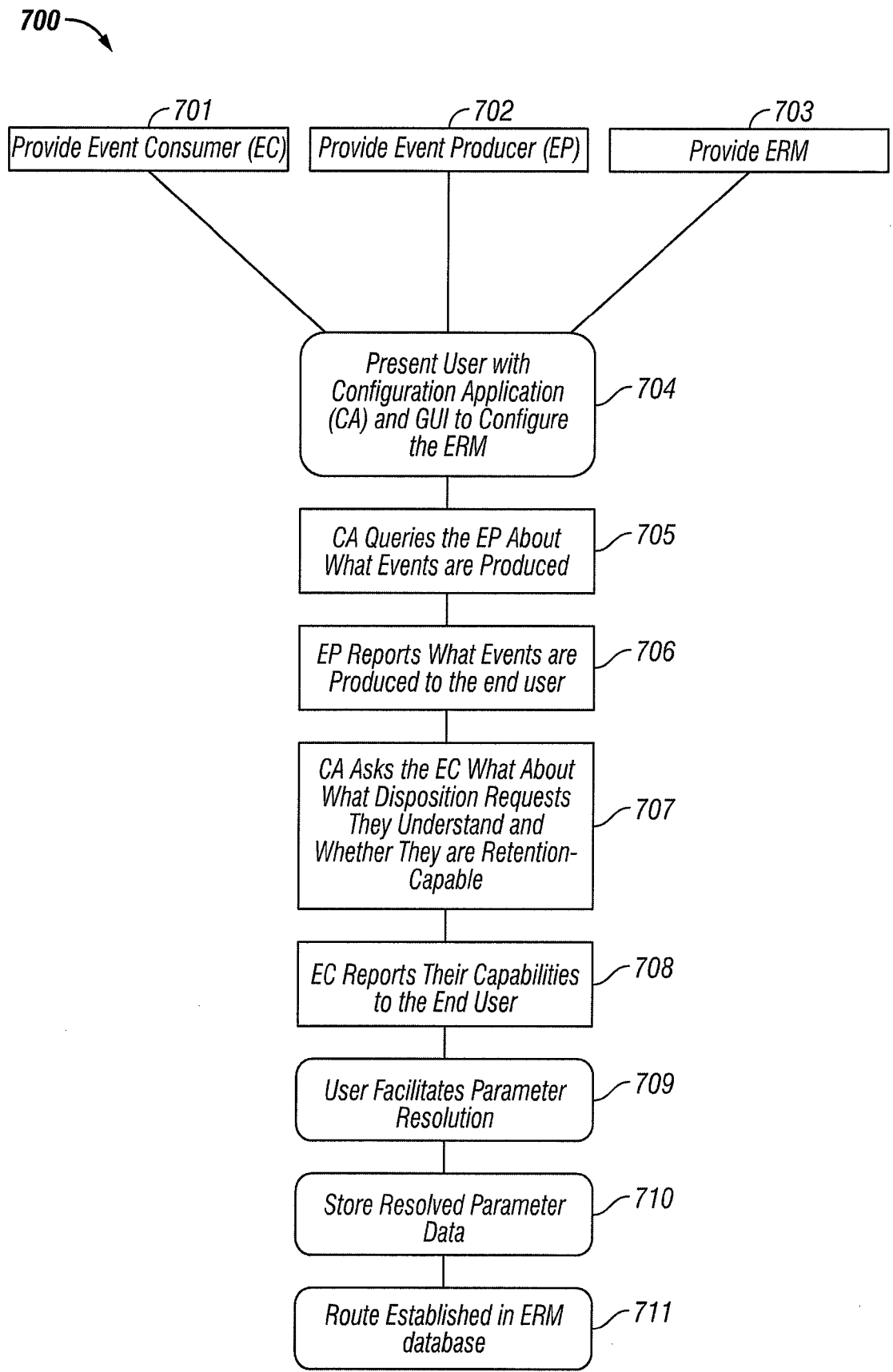
FIG. 7A illustrates a schematic flow diagram of the steps taken by a Configuration Application to route events according to some embodiments of the present invention.

FIG. 7A illustrates a flow chart diagram representing one example of a configuration step 700 according to the present invention. Initially an Event Consumer ("EC"), an Event Producer ("EP"), and an Enterprise Retention Management application ("ERM") are provided 701, 702, 703. Next, a system administrator is presented with a Graphical User Interface ("GUI") 704 to configure the system. Preferably, the GUI is a Configuration Application ("CA") on a computer readable medium which is coupled with the ERM.

Figure 7B:
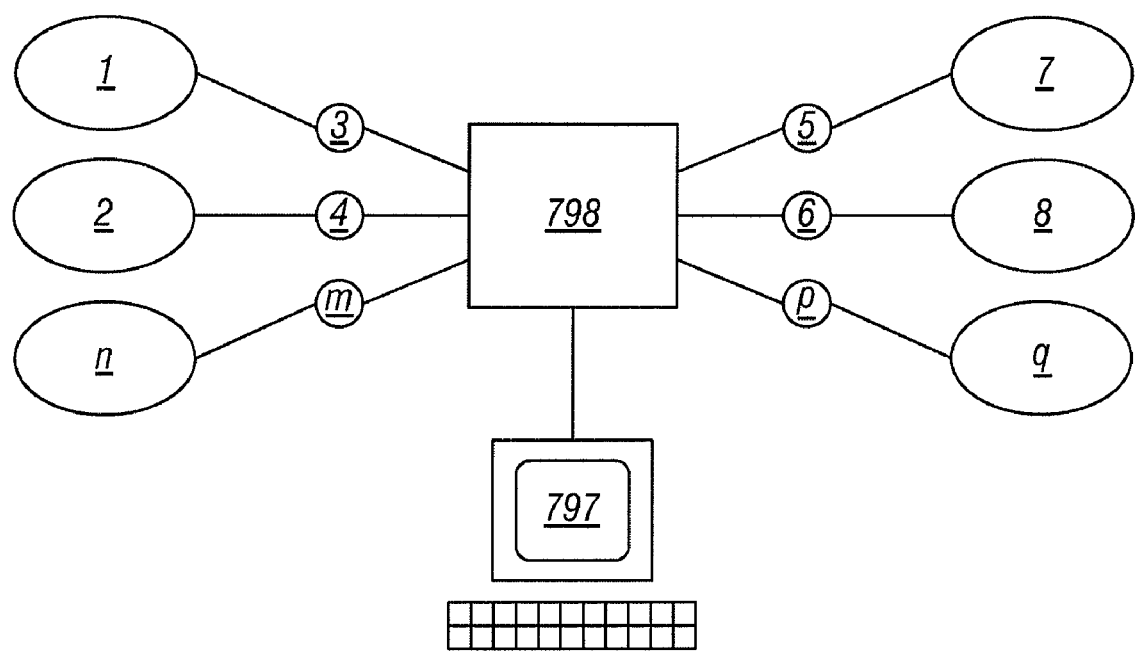
FIG. 7B illustrates an example of the Enterprise Retention Management System presented to a system administrator.

FIG. 7B illustrates an example of the Enterprise Retention Management System User Interface 799 presented to a system administrator. An Enterprise Retention Management (ERM) system 798 is coupled to Event Producers 1, 2 through n via connectors 3, 4 through m, respectively. Likewise, the ERM system 798 is coupled to Event Consumers 7, 8 through q via connectors 5, 6 through p, respectively. The ERM 798 is coupled with a computer 797 which contains a configuration application.

Referring again to FIG. 7A, once the system administrator is presented with the Configuration Application, an instruction is sent to the Event Producers 705 asking them about what events the Event Producers produce. The Event Producers report what events they produce to the Configuration Application 706. Likewise, an instruction is sent to the Event Consumers asking them about what disposition requests they understand, whether they are a retention-capable consumer (or conversely, a simple consumer) 707. The Event Consumers report this information to the Configuration Application 708. Next, the system administrator facilitates parameter resolution 709 where the capabilities of the Event Producers are matched with the Event Consumers and the parameters associated with the capabilities are resolved, or mapped. Furthermore, during the step of parameter resolution 709 the retention schedules and/or data types within the Event Consumer that are subject to disposition requests for certain business events are identified. Finally, the resolved parameter data is stored in the ERM 710 and a route is established in the ERM database 711.

Although a specific set of steps is disclosed, it will be readily apparent to those having ordinary skill in the art that a number of different methodologies may be utilized to establish a route for disposition request from event producers to event consumers.

For example, in some embodiments of the present invention, the Configuration Service call to the Event Producers and the Event Consumers occurs once during the ERM setup stage as opposed to the Routing Configuration stage.

Enhanced ERM Administrator Interface for Establishing Event Routes

According to the present invention, there are a number of ways to enhance the user interface available to an ERM administrator. Some of the selected options are as follows:

1. Ability to create a retention schedules and document types on the spot. This assumes that in step #3, there is no retention schedule associated with the event consumer. User interface can allow user create a retention schedule on the spot instead of choosing an existing retention schedule.
2. Ability to suggest possible event consumers based on retention schedules and document types they are associated with. Suppose Administrator already created a route between an event producer A and event consumer X. "X" has been associated with a retention schedule SC101. Event consumer "Y" is also associated with this retention schedule. When the Administrator tries to create a new route and chooses event producer "A", ERM suggests "Y" as a possible event consumer because it is also associated with "SC101".
3. Ability to suggest possible event consumers based on event consumer categorization. Suppose Administrator already created a route between an event producer A and event consumer X. "X" belongs to an event consumer category "HR document stores". Event consumer "Y" also belongs to this category. When the Administrator tries to create a new route and chooses event producer "A", ERM suggests "Y" as a possible event consumer because belongs to category "HR document stores".
4. Ability to suggest possible event consumers based on event consumer connector identifier. Suppose Administrator already created a route between an event producer A and event consumer X. The "X"'s connector exposes "connector implementation id" is 2322-34343-4544-6565665 in the response to the Configuration service request. The connector for event consumer "Y" also exposes the same ID. This means that underlying event consumers "X" and "Y" are of a similar nature. When the Administrator tries to create a new route and chooses event producer "A", ERM suggests "Y" as a possible event consumer because its connector implementation id is 2322-34343-4544-6565665.
5. Event consumer may expose through the Configuration service response the list of retention schedules and document types it supports for a given disposition request type. This will allow for restricting the Administrator choice on step #3 so she can choose only among the retention schedules and document types supported by this consumer with the context of a given disposition request type.

Furthermore, there exist numerous other interface enhancements which will become obvious to those having ordinary skill in the art who have the benefit of this disclosure.

Figure 7C:
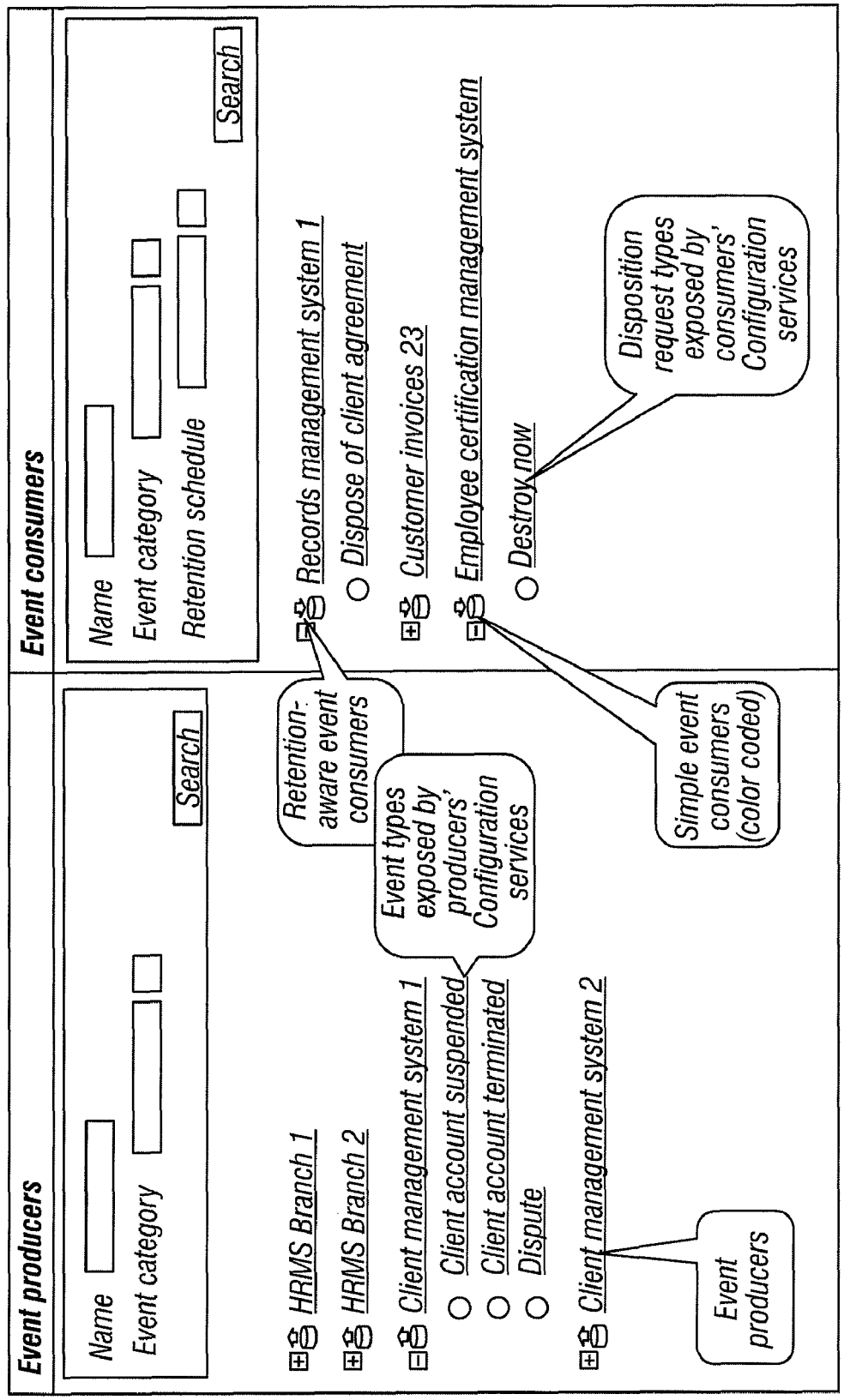
FIG. 7C illustrates an example of a graphical user interface for explicit routing according to some embodiments of the present invention.
Figure 7D:
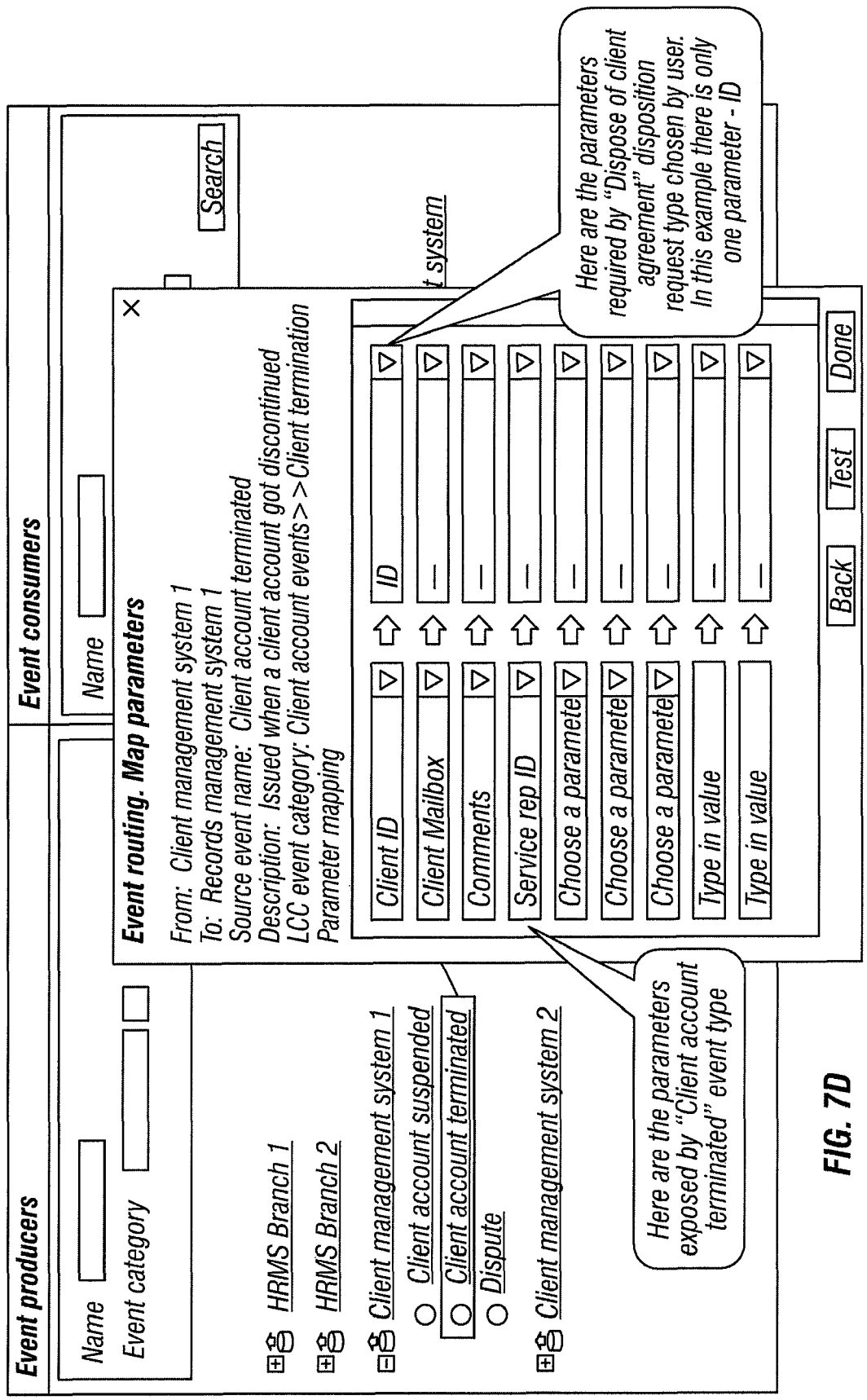
FIG. 7D illustrates an example of a graphical user interface for explicit routing according to some embodiments of the present invention.

FIGS. 7C and 7D illustrate some examples of graphical user interfaces for explicit routing according to some embodiments of the present invention.

Event Categorization

In some embodiments of the present invention, the ERM maintains a notion of event categories to categorize the types of business events that are used in retention schedules and are traveling from event producers to event consumers.

Event categories can be organized as a hierarchy or as a flat list. The values in the list (or leaves in the hierarchical tree) are actual event types that must be specified when the user creates a retention schedule.

Figures 8, 9A, 9B:
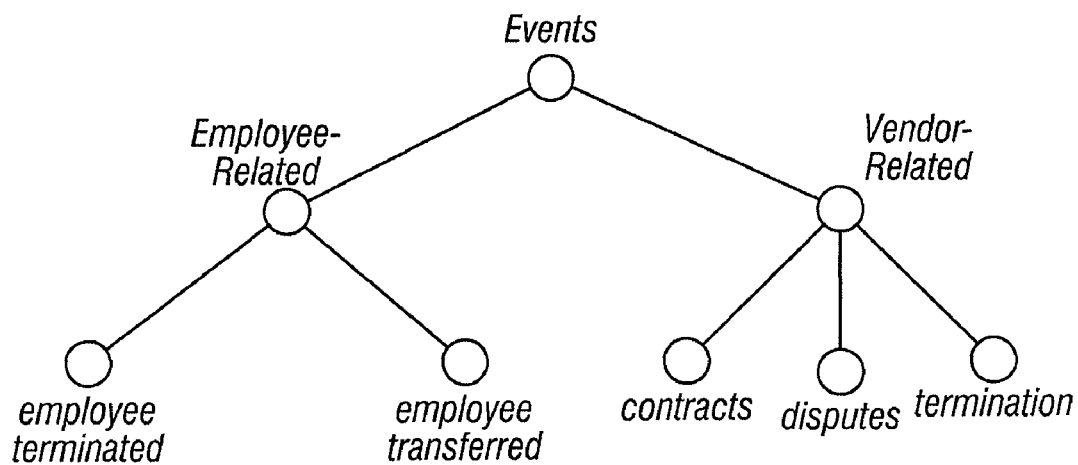
FIG. 8 illustrates a schematic representation of a portion of one possible event category hierarchy according to some embodiments of the present invention.
FIG. 9A illustrates an example of a structure of a disposition request according to some embodiments of the present invention.
FIG. 9B illustrates an example of a structure of a disposition request according to some embodiments of the present invention.

The nodes in the event hierarchy are event categories, groups of similar events. For example, an event type is "Employee terminated" and an event category is "Employee-related". FIG. 8 illustrates a schematic representation of a portion of one possible event category hierarchy according to some embodiments of the present invention. As shown, two types of events within the hierarchy are "employee related" and "vendor related". Within the "employee-related" branch, two types of events are listed: "employee terminated" and "employee transferred". Likewise, under the "vendor-related branch", a number of vendor-related events are shown.

Of course, the routing method described above doesn't require event categorization or even a notion of event types in ERM to operate. Once Administrator connected an event type on an event producer side to a disposition request type on event consumer side, ERM gets sufficient information to perform routing. However, event categorization by ERM may be necessary for reporting, setup and management purposes. For example user may want to see the list of disposition requests caused by employee-related events.

Note that event types exposed by event producer connector's Configuration service may not necessarily match the event types setup in ERM. Likewise, disposition request types exposed by event consumer connector's Configuration service may not necessarily match the event types setup in ERM.

Therefore, during the configuration of event producers and event consumers, Administrator must be able to associate event types exposed by connectors to the event types known to ERM. As a result of that, users will be able to use event categories and types known by ERM for search and reporting purposes or even trigger some business logic based on event type information.

Event categorization allows for streamlining the process of setting up the route. Since both event types exposed by event producers and disposition requests exposed by event consumers are mapped to event types in ERM event category hierarchy, once the administrator chose a business event type inside an event producer, ERM can prompt the Administrator about all the event consumers that expose disposition requests associated with the same event type or category as the selected business event type.

Conditional Filters

In some embodiments of the present invention, events need to be propagated to a consumer only when a certain condition is true. For example user email can be stored in multiple email archives. For example, email coming to/from Registered Brokers in an investment bank may be segregated from emails sent/received by the rest of the employees.

Within an ERM, this may be represented as multiple routes from a Human Resource Management system to multiple archives, each containing conditional logic (a Filter Application) that allows routing of events to a particular archive only for the users who belong to a proper employee category.

A Filter Application is an application that performs some actions based on values of parameters contained inside incoming business events and makes the decision whether the event should be resolved into a disposition request.

Consider the example of a Human Resource Management System (HRMS) being used with the ERM. The HRMS is set up for a business having two types of employees: normal employees and Registered Brokers. The HRMS also comprises an Event Source that deals with Employee Termination. Using this example, suppose that regulations require that trading transaction records must be kept about Registered Brokers and their activities in a record management system.

Likewise, the ERM is coupled with a Data Source comprising a record management system which contains all the records for the Registered Brokers. According to the present invention, the ERM propagates disposition requests to the record management system when an appropriate business event occurs. For example, when an employee is terminated, the ERM will forward a disposition request to the record management system. However, it is preferable to provide a Filter Application such that the ERM will only propagate the request if the employee is a Registered Broker.

Therefore, according to some embodiments of the present invention, a Filter Application is provided that is programmed with conditional logic that will determine whether the disposition request relates to a Registered Broker.

In some embodiments of the present invention, the Filter Application is implemented as a stand-alone application. In some other embodiments of the present invention, the Filter Application resides inside the ERM in the form of custom code that is injected in the ERM. In some embodiments, the custom code is written by implementation consultants in an interpreted scripting language, such as BeanShell.

In some embodiments of the present invention, the Filter applications are declared in ERM during the setup step. When an Administrator establishes a route, she associates the incoming event with a filter application.

According to these embodiments, when the Administrator attaches a filter application to the event, she maps event parameters to input parameters declared by the filter application so ERM knows which parameters from the incoming event should be forwarded to which input parameters in the filter application.

In some embodiments of the present invention, filter applications all have a common interface, which accepts a number of input parameters and returns single value telling ERM whether to proceed with the disposition request.

In other embodiments, when the Filter Application is a stand alone application, the types of input parameters it requires are obtained by ERM via a Configuration Service exposed by the Filter Application.

In yet other embodiments, injected Filter Application may declare their input parameters types through a pre-agreed application programming interface. Also, this can be achieved through user interface or configuration file.

Describing the Capabilities of the Applications and Connectors

Described above are producer connectors, consumer connectors, filter applications and parameter resolvers. In some embodiments of the present invention, process of describing and/or self-describing the capabilities of the applications and/or connectors is accomplished via the same mechanisms selected from among a configuration service, a user interface, a configuration file, an Application programming interface (API) call, and combinations thereof. In other embodiments, multiple mechanisms are separately utilized for the describing and/or self describing of the producer connectors, consumer connectors, filter applications and parameter resolvers.
Parameter Resolver Sometimes, there is not enough information inside the business event for a particular Event Consumer to perform a disposition. As a result, ERM needs to find this information elsewhere before compiling the disposition request. A typical situation is a global user ID that is not stored in HR management system but used in other applications that store information about users.

ERM should be able to find this information using external applications. After this information is found, it should be added to the event parameters, so that it can be forwarded to the disposition request.

Parameter resolution can be done by calling a Parameter Resolver application, which is an external application responsible for deriving missing parameters based on information provided in business event. Alternatively, this application may reside inside ERM in a form of custom code (most likely written by implementation consultants in an interpreted scripting language such as BeanShell) that can be injected into ERM.

Resolvers must be declared in ERM during setup. When Administrator tries to establish a route, she needs to be able to associate the incoming event with a resolver application. Once the event is associated, it will appear as if it has more event parameters (those coming originally from the event, and those coming from the resolver).

When Administrator attaches the resolver to the event, she needs to map event parameters to input parameters of the resolver so ERM knows which parameters from the incoming event should be forwarded to which input parameters in the resolver.

All resolvers must have the same interface that accepts multiple input parameters and returns multiple output parameters (both names and values).

In some embodiments, resolvers declare the parameters they accept through the same mechanism as the Filter Application (i.e. a Configuration Service or a predefined API).
Automatic Parameter Resolution In some embodiments of the present invention, the parameters for a set of Event Consumers and a set of Event Producers are resolved automatically.
Triggering Legacy Events Routes can be established after event produces already issued some events. ERM can either propagate only the events that entered ERM (or occurred) after the route has been established or it can also propagate old events to the newly established route.

This behavior can also be dynamically configured on the application level and will apply to all the routes created afterwards. Or it can be decided during the route setup by offering the user to propagate old events and even allowing her to choose particular events that need to be propagated.
The Structure of a Disposition Request When It Comes to Passing Retention Schedule Information to Event Consumers The architecture of event-driven disposition may either require ERM to pass a reference to a retention schedule and document type to event consumers, or may allow it as an option, or may require the entire retention schedule object to be sent, or may not allow this possibility at all. Some possible scenarios of propagating retention schedules are presented below:

Retention Schedule References Required for Retention-Capable Consumers.

In this architecture, when a disposition request is created, it is always associated to an intersection of event consumer and retention schedule(s) or document types(s). In a body of disposition request, the consumer always receives the following information:

Ids of retention schedules (document types) affected input parameters

When such a request comes to the event consumer, the event consumer should be able to locate the records based on some retention schedule IDs or retention schedule+document type IDs.

Note, that in such architecture, event consumer is expected to expose a single disposition request type that will receive retention schedule ID as a parameter along with other parameters of the disposition request.

FIG. 9A illustrates an example of a disposition request associated to an intersection of event consumer and retention schedule(s) or document types(s).
Retention Schedule References Not Needed.

In this architecture, instead of accepting a retention schedule ID as a parameter, the consumer's connector can just expose multiple disposition event types, one per retention schedule.

Likewise the ERM expose three disposition request types, wherein each doesn't require retention schedule ID as a parameter because each is mapped to a single retention schedule by design of the connector.

FIG. 9B illustrates an example of a disposition request wherein multiple request types are sent and each is mapped to a single retention schedule.

The latter approach gives a few benefits: 1. Disposition event types are easier to categorize and browse in ERM; 2. There is no problem with optional parameters.

In the former approach all parameters except retention schedule id were optional, but they became required depending on the value of retention schedule ID chosen. Such logic is harder to define in configuration service and harder to implement. In this approach, parameters are highly relevant to the disposition request type and easy to understand by Administrator during setup. However, for certain types of consumers, such as Record Management Systems capable of being setup at runtime to manage multiple retention schedules, such architecture may become suboptimal from the software design standpoint because clients will have to modify the connector code each time a new document type is added to the record management system.
Making It Optional In some scenarios, it still makes sense to provide retention schedule and document type IDs during the disposition request call. For example, the event consumer that stores various types of contracts may expose two disposition request types one for HR documents requiring person id as a parameter, another one—for client documents requiring client ID as a parameter.

However, inside HR document disposition request, the connector may require the document type ID so it can distinguish between 401K and Employment contracts. Obviously, such a connector can be re-designed to expose two HR-related disposition requests, but it might make more sense to provide retention information as an argument in this particular scenario.

In this architecture, connector can specify (in the response to Configuration service request) whether it needs retention schedule or document type information as an argument for a particular type of disposition request.
Passing the Entire Retention Schedule Object In this architecture, the entire retention schedule object (not only id) is passed to the connector during the disposition request. In spite of higher network traffic requirements, this may be a valid option because it does not require a retention-capable event consumer to know anything upfront about the retention schedules it needs to enforce.

The flipside of this solution is problems with change propagation when retention schedule parameters (such as retention period) have changed after the disposition request has been communicated to the connector.

Summary

The ERM of the present invention makes it feasible to implement event-driven disposition on an enterprise scale and cuts the cost of disposition by reducing the headcount needed for performing the disposition. Furthermore, the ERM of the present invention increases the accuracy of disposition through reducing the dependency on human factor. This may result in less legal costs.

Furthermore, the ERM of the present invention provides standardized protocols for event producers to communicate the events and event consumers to receive disposition requests, thus allowing information system vendors to build event-disposition functionality into their products upfront. The proposed method makes it possible to automate disposition for both retention policy capable event consumers that can count the retention period and trigger disposition in future, and simple event consumers that can only perform immediate disposition.

Furthermore, the ERM of the present invention may become a retention policy enforcement layer for the data sources that are otherwise not capable of executing data disposition based on retention policy information.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

What is claimed is:

1. A computer implemented method of managing the retention and disposition of data in an Enterprise Retention Management System comprising:
    providing at least one event consumer, wherein data is stored in the at least one event consumer;
    providing at least one event producer, wherein at least one business event message originates in the at least one event producer, wherein the at least one business event message provides an indication of at least one business event has an intended effect on at least a portion of the data within the at least one event consumer, and wherein the at least one business event indicates a change in status at an organization;
    polling the at least one event producer about what type of events are produced by the at least one event producer;
    receiving, from the at least one event producer, information about what type of events are produced by the at least one event producer, wherein each type of event produced by the at least one event producer declares at least one event parameter, and wherein the at least one business event is of an event type in the type of events produced by the at least one event producer;
    providing an Enterprise Retention Management System;
    propagating the at least one business event message from the at least one event producer to the Enterprise Retention Management System;
    identifying a portion of the data within the event consumer affected by the business event message;
    translating the at least one business event into a data disposition request, wherein the data disposition request is of a data disposition type that is related to the event type of the at least one business event;
    propagating the data disposition request to the at least one event consumer; and
    disposing of at least a portion of the data within the event consumer based on the disposition request.

2. The method according to claim 1, wherein the event consumer is selected from among: file systems, content management systems, document management systems, structured applications, email servers and archives, file archives, electronic discovery databases, court record databases, and proprietary information management systems.

3. The method according to claim 1, wherein the at least one business event message is propagated by any of web service requests, electronic mail communications, peer-to-peer transfers, instant messaging communications, and native application programming interface (API) calls.

4. The method according to claim 1, wherein the Enterprise Retention Management System stores at least one retention schedule for the data stored in the at least one event consumer, wherein the at least one retention schedule contains information relating to the rules regarding the data's retention.

5. The method according to claim 1, wherein the Enterprise Retention Management System stores a reference to the at least one event producer.

6. The method according to claim 1, wherein the Enterprise Retention Management System stores a reference to the at least one event consumer.

7. The method according to claim 1, wherein the Enterprise Retention Management System stores reference to at least one relationship between at least one event consumer and at least one retention schedule, wherein the relationship defines a type of records stored in the at least one event consumer and defines what retention schedule is to be applied to the records.

8. The method according to claim 1, wherein the step of propagating the event message from the at least one event producer to the Enterprise Retention Management System comprises the Enterprise Retention Management System communicating with the at least one event producer, and wherein the Enterprise Retention Management System receives business event messages from the at least one event producer.

9. The method according to claim 8, wherein the event producer pushes a business event message to the Enterprise Retention Management System.

10. The method according to claim 8, wherein the Enterprise Retention Management System pulls a business event message from the at least one event producer.

11. The method according to claim 8, further comprising:
    establishing a standard protocol for exchanging business events between the at least one event producer and the Enterprise Retention Management System.

12. The method according to claim 8, further comprising:
    establishing at least one connector between the at least one event producer and the Enterprise Retention Management System, wherein the at least one connector comprises a proxy for translating the business event message to be understood by the Enterprise Retention Management System.

13. The method according to claim 1, wherein propagating the at least one business event message from the at least one event producer to the Enterprise Retention Management System further comprises:
  manually entering the at least one business event message, by a user, into a user interface to the Enterprise Retention Management System.

14. The method according to claim 1, further comprising:
  polling the at least one event consumer about the at least one event consumer's capabilities;
  receiving from the at least one event consumer information about the at least one event consumer's capabilities, wherein the at least one event consumer's capabilities are represented by at least one type of disposition request containing at least one parameter;
  choosing one event type from said at least one event producer and one disposition request type from said at least one event consumer and relating said event type and said disposition request type; and
  identifying at least one parameter within said event type that corresponds to at least one parameter within said disposition request type, wherein linked parameters are formed; and
  optionally choosing at least one retention schedule and optionally choosing at least one document type from said at least one event consumer and associating said retention schedule and said document type with an instructional route.

15. The method according to claim 14, wherein the event consumer comprises a user interface for manual execution of disposition.

16. The method according to claim 14, wherein receiving information from the at least one event consumer about the at least one event consumer's capabilities includes receiving information that the at least one event consumer is a simple consumer, wherein the simple consumer is not capable of managing a disposition based on a retention schedule for the data contained therein.

17. The method according to claim 16, further comprising:
  managing a retention schedule within the Enterprise Retention Management System, wherein propagating the data disposition request to the at least one event consumer comprises sending a delete request.

18. The method according to claim 14, wherein receiving information from the at least one event consumer about the at least one event consumer's capabilities includes receiving information that the at least one event consumer is a retention-capable consumer, wherein a retention-capable consumer is capable of managing a disposition based on a retention schedule for the data contained therein.

19. The method according to claim 18, wherein propagating the data disposition request to the at least one event consumer comprises sending the disposition request to the at least one consumer, said disposition request comprising parameters for identifying data which is subject to disposition, said parameters comprising a retention schedule and, optionally, a document type; wherein said disposition request is sent to said consumer as soon as possible after an event is received from a producer.

20. The method according to claim 18, wherein propagating the data disposition request to the at least one event consumer comprises sending a separate API call for each particular retention schedule contained within the event consumer.

21. The method according to claim 18, wherein propagating the data disposition request to the at least one event consumer comprises sending a full detailed record of the retention schedule and disposition instructions.

22. The method according to claim 14, further comprising:
  manually creating a retention schedule for at least one consumer.

23. The method according to claim 14, further comprising:
  providing a user with a list of event categories to facilitate linking event types in a producer with disposition request types in a consumer.

24. The method according to claim 23, wherein the categories are presented to the user in a hierarchical format.

25. The method according to claim 14, further comprising:
  providing a Filter Application that comprises conditional logic for determining whether a business event affects an Event Consumer based on the event parameters, wherein the Filter Application filters types of disposition requests based on the event parameters.

26. The method according to claim 14, further comprising calling a Parameter Resolver to provide additional information that is missing from an event coming from an event producer.

27. The method of claim 1, wherein the at least one business event indicates at least one of: a change in status of an employee at the organization, a change in status of a customer of the organization, a change in status of a product offered by the organization, and a change in status of a service offered by the organization.

28. An enterprise retention management apparatus comprising:
  at least one processor;
  at least one event producer operable on the at least one processor, wherein the at least one event producer is configured to produce at least one business event message, wherein the at least one business event message relates to a business event, and wherein the business event indicates a change in status at an organization;
  at least one event consumer data source stored on a computer-readable storage medium and containing electronically stored information, wherein the electronically stored information has an associated retention schedule; and
  an enterprise retention management (ERM) application stored on the computer-readable storage medium and operable on the at least one processor, wherein the (ERM) application is configured to:
  poll the at least one event producer about what type of events are produced by the at least one event producer,
  receive, from the at least one event producer, information about what type of events are produced by the at least one event producer, wherein each type of event produced by the at least one event producer declares at least one event parameter, and wherein the at least one business event is of an event type in the type of events produced by the at least one event producer,
  accept the at least one business event message from the at least one event producer, and
  alter the retention schedule of the electronically stored information based at least in part on the business event.

29. The enterprise retention management apparatus according to claim 28, wherein the event consumer is selected from among: file systems, content management systems, document management systems, structured applications, email servers and archives, file archives, electronic discovery databases, court record databases, and proprietary information management systems.

30. The enterprise retention management apparatus according to claim 28, wherein the at least one event producer is configured to send and the enterprise retention management application is configured to receive any of web service requests, mail server requests, peer-to-peer transfers, instant messaging protocols, and native API calls.

31. The enterprise retention management apparatus according to claim 28, further comprising at least one event producer ERM connector comprising an interface for communication between the at least one event producer and the enterprise retention management application.

32. The enterprise retention management apparatus according to claim 28, further comprising at least one consumer ERM connector comprising an interface for communication between the at least one event consumer and the enterprise retention management application.

33. The enterprise retention management apparatus according to claim 28, further comprising a Configuration Application stored on a computer-readable medium and a Graphical User Interface coupled with the Enterprise Retention Management application.

34. The enterprise retention management apparatus according to claim 28, wherein the business event indicates at least one of: a change in status of an employee at the organization, a change in status of a customer of the organization, a change in status of a product offered by the organization, and a change in status of a service offered by the organization.

35. A computer program product for managing the retention and disposition of data in an Enterprise Retention Management System, the computer program product comprising a computer readable storage medium having program code embodied within, the program code executable by at least one programmable processor to perform a method comprising:
   providing at least one event consumer, wherein data is stored in the at least one event consumer;
   providing at least one event producer, wherein at least one business event message originates in the at least one event producer, wherein the at least one business event message provides an indication of at least one business event has an intended effect on at least a portion of the data within the at least one event consumer, and wherein the at least one business event indicates a change in status at an organization;
   polling the at least one event producer about what type of events are produced by the at least one event producer;
   receiving, from the at least one event producer, information about what type of events are produced by the at least one event producer, wherein each type of event produced by the at least one event producer declares at least one event parameter, and wherein the at least one business event is of an event type in the type of events produced by the at least one event producer;
   providing an Enterprise Retention Management System;
   propagating the at least one business event message from the at least one event producer to the Enterprise Retention Management System;
   identifying a portion of the data within the event consumer affected by the business event message;
   translating the at least one business event into a data disposition request, wherein the data disposition request is of a data disposition type that is related to the event type of the at least one business event;
   propagating the data disposition request to the at least one event consumer; and
   disposing of at least a portion of the data within the event consumer based on the disposition request.

36. The computer program product of claim 35, wherein the at least one business event message is propagated by any of web service requests, electronic mail communications, peer-to-peer transfers, instant messaging communications, and native application programming interface (API) calls.

37. The computer program product of claim 35, wherein the Enterprise Retention Management System stores at least one retention schedule for the data stored in the at least one event consumer, wherein the at least one retention schedule contains information relating to the rules regarding the data's retention.

38. The computer program product of claim 35, wherein the Enterprise Retention Management System stores a reference to the at least one event producer.

39. The computer program product of claim 35, wherein the Enterprise Retention Management System stores a reference to the at least one event consumer.

40. The computer program product of claim 35, wherein the Enterprise Retention Management System stores reference to at least one relationship between at least one event consumer and at least one retention schedule, wherein the relationship defines a type of records stored in the at least one event consumer and defines what retention schedule is to be applied to the records.

* * * * *